United States Patent [19]

Antonissen

[11] Patent Number: 5,209,339
[45] Date of Patent: May 11, 1993

[54] CONVEYOR SYSTEM FOR MULTIPLYING SLICES OF PRODUCT

[75] Inventor: Peter H. Antonissen, Norfolk, England

[73] Assignee: Thurne Engineering Co., Ltd., England

[21] Appl. No.: 908,557

[22] PCT Filed: Apr. 25, 1989

[86] PCT No.: PCT/GB89/00501

§ 371 Date: Dec. 20, 1990

§ 102(e) Date: Dec. 20, 1990

[87] PCT Pub. No.: WO89/10318

PCT Pub. Date: Nov. 2, 1989

Related U.S. Application Data

[63] Continuation of Ser. No. 623,733, Dec. 14, 1990, abandoned.

[30] Foreign Application Priority Data

Apr. 28, 1988 [GB] United Kingdom ............... 8810057

[51] Int. Cl.⁵ .............................................. B65G 47/26
[52] U.S. Cl. .................. 198/436; 198/419.1; 198/431; 198/586; 198/817
[58] Field of Search ................ 198/436, 419.1, 419.2, 198/431, 432, 434, 463.6, 631, 458, 817, 586

[56] References Cited

U.S. PATENT DOCUMENTS

| | | | |
|---|---|---|---|
| 3,545,588 | 12/1970 | Corley | 198/817 |
| 3,854,569 | 12/1974 | Steinhart et al. | 198/434 X |
| 4,067,435 | 1/1978 | Toby | 198/434 |
| 4,120,393 | 10/1978 | Motooka et al. | 198/463.6 |
| 4,256,434 | 3/1981 | Stodt et al. | 198/436 X |
| 4,529,082 | 7/1985 | Mally | 198/434 |
| 4,599,025 | 7/1986 | Borsuk et al. | 198/436 X |
| 4,846,336 | 7/1989 | Hoyland et al. | 198/436 X |
| 5,025,909 | 6/1991 | De Benedetti | 198/463.6 X |

FOREIGN PATENT DOCUMENTS

| | | |
|---|---|---|
| 274229 | 7/1988 | European Pat. Off. |
| 1371535 | 7/1964 | France . |
| 2168967 | 7/1973 | France . |
| 2248216 | 5/1975 | France . |
| 2492783 | 4/1982 | France . |
| 2587007 | 11/1987 | France . |

Primary Examiner—Robert P. Olszewski
Assistant Examiner—Cheryl Gastneau
Attorney, Agent, or Firm—Sughrue, Mion, Zinn, Macpeak & Seas

[57] ABSTRACT

A conveyor system for multiplying one or more input streams of product into two or more output streams of product is constituted by an input conveyor (4) for conveying the one or more input streams of product, a transfer conveyor (5) which is movable bodily in a direction transverse to its conveying direction and which is arranged to receive products from the input conveyor (4), and a multi-lane output conveyor (6) which carries multiple side-by-side streams of product and is arranged to receive products from the transfer conveyor (5). The conveyor system also includes apparatus to control the forward movement of the products in the one or more input streams of product, and the forward movement of the products in each stream on the output conveyor (6) to enable the products to be aligned with one another across the output conveyor. Preferably the control apparatus collects successive products into groups so that the products are transferred from the input conveyor (4) to the transfer conveyor (5) in groups.

8 Claims, 8 Drawing Sheets

CONVEYOR SYSTEM FOR MULTIPLYING SLICES OF PRODUCT

This is a continuation of application Ser. No. 07/623,733 filed Dec. 14, 1990 abandoned.

The present invention is concerned with a system for changing the number of streams or lanes of product being conveyed along a flow line and particularly to conveyor systems for multiplying one or more input streams into two or more output streams.

Conventionally conveyor systems for changing the number of streams of product usually include a simple smooth flat belt conveyor and a series of fixed kerbs or belt conveyors operating in a vertical plane which guide the products in the lateral direction of the belt conveyor to slide the products laterally across the belt conveyor and so divide an incoming stream into two or more more output streams. Examples of these conventional conveying systems are described in FR-A-2587007 and FR-A-2168967.

Another known system is described in FR-A-2248216 which comprises an input conveyor for conveying the one or more input streams of product, a transfer conveyor which is movable bodily in a direction transverse to its conveying direction and which is arranged- to receive products from the input conveyor, and a multi-lane output conveyor which carries multiple side-by-side streams of product and is arranged to receive products from the transfer conveyor. This system is described as conveying cans which are constrained into separate lanes on the output conveyor by kerbs. The transfer conveyor is oscillated continuously between its extreme transverse positions to divide the input stream evenly between the output streams. When all the output streams are full inflatable buffers engage the sides of the cans on the input conveyor to prevent them being fed to the transfer conveyor. During this, as well as during transfer between the input conveyor and the transfer conveyor, and between the transfer conveyor and the output conveyor, slip occurs between the base of the cans and the conveyors.

FR-A-1371535 discloses a conveyor system for feeding cut lengths of extruded product from an input conveyor evenly to a three lane output conveyor. The blocks are fed from the input conveyor to an intermediate roller table. From here, whilst their forward movement is arrested they are lifted and shifted sideways by reciprocating fingers intercallated between the rollers of the roller table. The output conveyor includes an abutment extending across all lanes to hold the blocks until they are present in all three lanes before allowing them to proceed along the output conveyor.

It is not possible however to use such systems to handle all products. For example individual slices, stacks, or shingles of slices of meat or meat products or other sticky, soft or crumbly foodstuffs need to be conveyed positively and cannot be held or pushed by kerbs or guides and made to slide over the surface of a belt conveyor. One way in which a stream of such products have been multiplied into a number of output streams is using what is known as a channelliser. A channelliser consists of a number of product carriers each of which is slideably mounted between pairs of parallel rods. The rods are equally spaced and have their opposite ends secured to chains which are driven around sprocket wheels to form a moving continuous belt of parallel rods. One or more product carrier deflectors are mounted beneath the belt of parallel rods and guide the product carriers to move them transversely along the rods as the continuous belt of rods moves forward. The carrier deflector includes an initial movable portion which switches individual groups of product carriers so that they follow one of two or more different paths. The product such as slices of meat or meat product are deposited on a group of product carriers and then this group of carriers slide along their parallel rods and hence are moved transversely as the group is conveyed forward and is output in one of two or more output streams.

Problems occur with conventional channellisers when handling flexible sticky products such as slices of meat because the slices tend to get trapped between adjacent product carriers which causes damage to the slices and the arrangement of a stack or shingle of slices. Further, since the individual product carriers are moved transversely at different times and the products tend to stick to each individual product carrier, the products are distorted. This can displace slices in a shingle or lead to tearing of the meat or meat product. This relative transverse movement occurs both at the start of the transverse displacement .of the product and on its completion. This disturbance not only affects the visual presentation of a stack or shingle of products but can also displace the stack or shingle sufficiently to prevent them being automatically loaded into a downstream vacuum packaging machine.

Our earlier European patent application EP-A-0274229 having U.S. Pat. No. 4,846,336 as an equivalent describes a marshalling system specifically intended to handle meat and meat products which does enable one or more input product streams to be multiplied into two or more output streams. This conveyor system includes a multi-element strip conveyor having its upstream input end arranged to receive products from an input stream and having its downstream end arranged to move laterally to deposit products from the input stream into two or more output streams shifted laterally with respect to the input stream. This arrangement overcomes many of the problems of the conventional channelliser but still leads to a twisting movement being imposed upon the products as they travel along the multi-element strip conveyor. The twisting movement is much more gentle than that imposed by a conventional channelliser but can still, in some circumstances, lead to displacement of adjacent slices in a shingle.

According to this invention a conveyor system for multiplying one or more input streams of product into two or more output streams of product comprises an input conveyor for conveying the one or more input streams of product, a transfer conveyor which is movable bodily in a direction transverse to its conveying direction and which is arranged to receive products from the input conveyor, and a multi-lane output conveyor which carries multiple side-by-side streams of product and is arranged to receive products from the transfer conveyor, and is characterized in that the conveyor system also includes means to control the forward movement of the products in the one or more input streams of product, and means to control the forward movement of the products in each stream on the output conveyor to enable the products to be aligned with one another across the output conveyor.

In the simplest form of the present invention a single spaced stream of products is conveyed by the input conveyor and the means to control the forward movement of the products ensures that the products are entirely on one conveyor when the transfer conveyor moves transversely, and thus do not span a joint between the input conveyor and the transfer or that between the transfer conveyor and the output conveyor during transverse movement of the transfer conveyor. The products move in turn from the input conveyor to the transfer conveyor and as soon as the movement from the input conveyor to the transfer conveyor of one product has been completed the transfer conveyor is shifted bodily in the transverse direction at the same time that it continues to convey the products in the forward direction towards the output conveyor. Upon completion of the transverse movement of the transfer conveyor the one product is typically discharged from the downstream end of the transfer conveyor onto the output conveyor and, simultaneously the next product from the input conveyor is moved on to the upstream end of the transfer conveyor. Upon completion of this operation the transfer conveyor is again moved bodily in the transverse direction so that the next product is deposited into a different stream of products on the output conveyor at the same time as a following product moves onto the upstream end of the transfer conveyor. This process is repeated with the transfer conveyor moving transversely between the two or more output streams that are formed on the output conveyor to discharge the products into each of the output streams in succession. To align the successive products into a row across the output conveyor the means to control the forward movement of the products stops the forwards movement of, one or more of the products on the output conveyors until successive products are brought into alignment across the output conveyor.

Whilst this is the simplest arrangement in accordance with the present invention it is reasonably slow because the products have to be spaced on the input conveyor sufficiently far apart to enable sufficient time for the bodily transverse movement of the transfer conveyor between successive products. Accordingly, it is very much preferred that the means to control the forward movement of the products collects the successive products into groups so that the products are transferred from the input conveyor to the transfer conveyor in groups. With the system arranged in this way a group of products is then transferred from the input conveyor to the transfer conveyor whilst the transfer conveyor remains in a particular transverse location and then, after completion of the transfer of a first group, the transfer conveyor is moved bodily in the transverse direction before the second group of products is transferred from the input conveyor to the transfer conveyor. The transverse movement of the transfer conveyor takes place before the first group of products are discharged from the transfer conveyor so that the first group of products are transferred only after the transfer conveyor has been moved transversely and typically simultaneously with the transfer of the second group onto the transfer conveyor. This results in a considerable improvement in the operating speed of the conveyor system in accordance with this invention since the transfer conveyor only has to be moved bodily transversely after the transfer of each group of products and so typically only after every two, three, four or more products.

Preferably the input conveyor and means to control the forward movement of products comprise a multi-element belt or strip conveyor with one or more moveable stop platforms formed by upright elongate plates intercalated between bands of the conveyor. The downstream stop platform is raised when the product to form the first product of each group reaches it, the next stop platform is raised when the second product of each group reaches it, and so on until the upstream platform is raised when the penultimate product for that group reaches it. Then all of the platforms are lowered as the final product of the group approaches so that the group of products all move together along the conveyor and onto the transfer conveyor.

Instead of using liftable stop platforms the input conveyor and means may comprise a number of individual short conveyors located one behind the other and arranged with the drive of each conveyor being independently controlled so that upon the arrival of the first product of each group, the downstream short conveyor is stopped. Upon arrival of the second product the next is stopped, and so on with successive products until, upon the arrival of the final product of the group, all conveyors start again to provide a group of products which is spaced in the conveying direction from the next group of products. In this case it is preferred that the conveyors accelerate and decelerate smoothly to ensure that no slippage of the products on the conveyors takes place.

The output conveyor may be formed by a conventional multi-element belt or strip conveyor with a single drive providing the forward movement of all of the streams of products carried by the output conveyor. In this case it is preferred that the means to control the forward movement of the products are formed by one or more moveable stop platforms formed by upright elongate plates intercalated between bands of the output conveyor which can be lifted to lift products upwards out of contact with the moving elements of the multiple element strip conveyor and so hold the groups of products at a particular location until a succeeding product in another stream reaches the same location and is aligned with it, whereupon the platforms are lowered so that transverse rows of product are formed across the output conveyor. Alternatively the output conveyor may be formed by a number of separate conveyors mounted side-by-side with each including an independent drive. In this case the means to control the forward movement of the products is formed by the independent drive of the independent conveyors and their controllers. In this way the forward movement of one of the output conveyors conveying a first, or a first group, of products is stopped until a second, or second group, of products being carried by another output conveyor beside it is aligned with it. The drive of both conveyors is then operated so that transverse rows of product are conveyed simultaneously by their individual output conveyors.

More than one transfer conveyor may be included between the input and output conveyors. For example the first transfer conveyor may receive products from the input conveyor in a single lane and discharge them in two lanes on the second transfer conveyor. The second transfer conveyor then doubles up both lanes to provide four lanes of product on the output conveyor. In this case the first transfer conveyor moves transversely twice the distance of the second transfer conveyor.

The conveyor system may form part of a foodstuff packaging line comprising, in order, a slicing machine for cutting slices from a block of foodstuff, a jump conveyor to group the slices together into stacks or shingles, a conveyor system in accordance with the invention, and a multi-lane vacuum packaging machine which vacuum packs the stacks or shingles of foodstuff. However, it may also be used to handle other commodities. It is particularly useful for "soft packs" —bags only loosely filled with seeds, peanuts, rice, pulses or other particulate materials and in the bottling and canning industries. Whilst such articles are often maneuvered by kerbs, when they have freshly applied labels or decoration it is useful for them to be maneuvered without side contact. The present invention provides a very versatile system and one in which the multiplying arrangement can easily be changed.

A meat packaging line including a conveyor system in accordance with this invention will now be described with reference to the accompanying drawings, in which.

Figure 1:
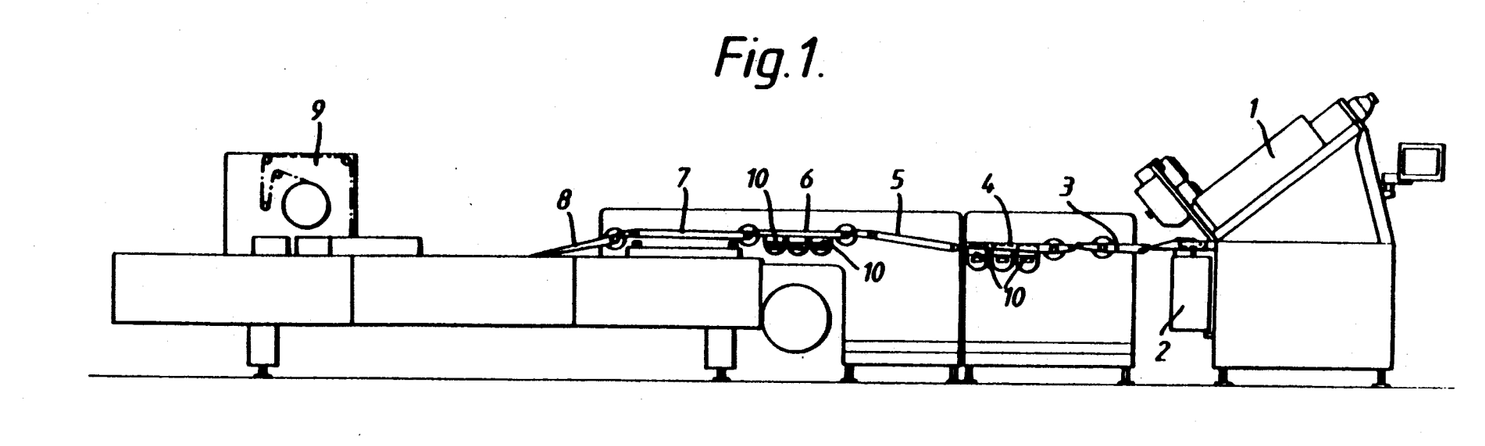
FIG. 1 is a side elevation of the packaging line.
Figure 2:
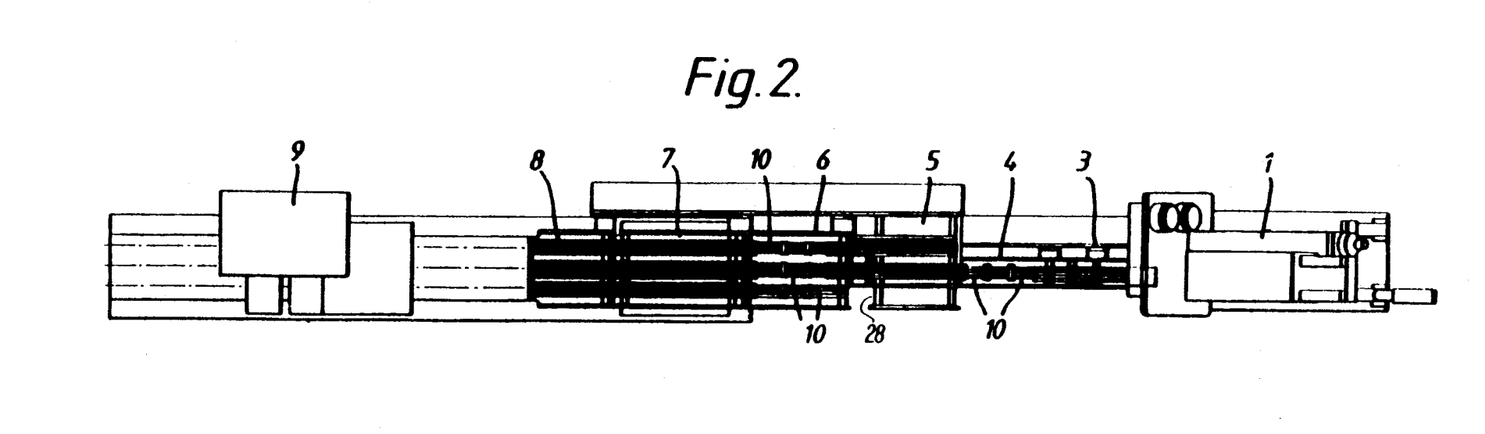
FIG. 2 is a plan of the packaging line.

The sliced meat packaging line comprises a slicing machine 1 such as a slicer known by the, trade name of Polyslicer manufactured by the applicants of this invention, a jump conveyor 2 downstream of the slicer, a centraliser and reject conveyor 3, an input conveyor 4, a transversely moveable transfer conveyor 5, an output conveyor 6, further conveyors 7 and 8 and a vacuum packaging machine 9. The slicing machine 1, jump conveyor 2, centraliser and reject conveyor 3, further conveyors 7 and 8, and vacuum packaging machine 9 are all entirely conventional in construction. The output conveyor 6 is formed by a multi-element strip conveyor and includes nine platforms 10 each formed by a series of upright elongate plates 18 intercalated between bonds 16 of a multi-element conveyor. The platforms are moveable upwards and downwards and act to lift groups of slices of products upwards clear of the output conveyor 6 to stop them in their positions until a 3×3 arrangement of products are located on the platforms 10. At this point all platforms 10 are lowered simultaneously to feed a 3×3 matrix of products along the further conveyor 7 and 8 and into the vacuum packaging machine 9.

The arrangement of the output conveyor 6 is generally similar to that described in detail in our earlier European application EP-A-0274229 and corresponding U.S. Pat. No. 4,846,336 and will now be described in more detail with reference to FIGS. 3 and 4.

Figure 3:
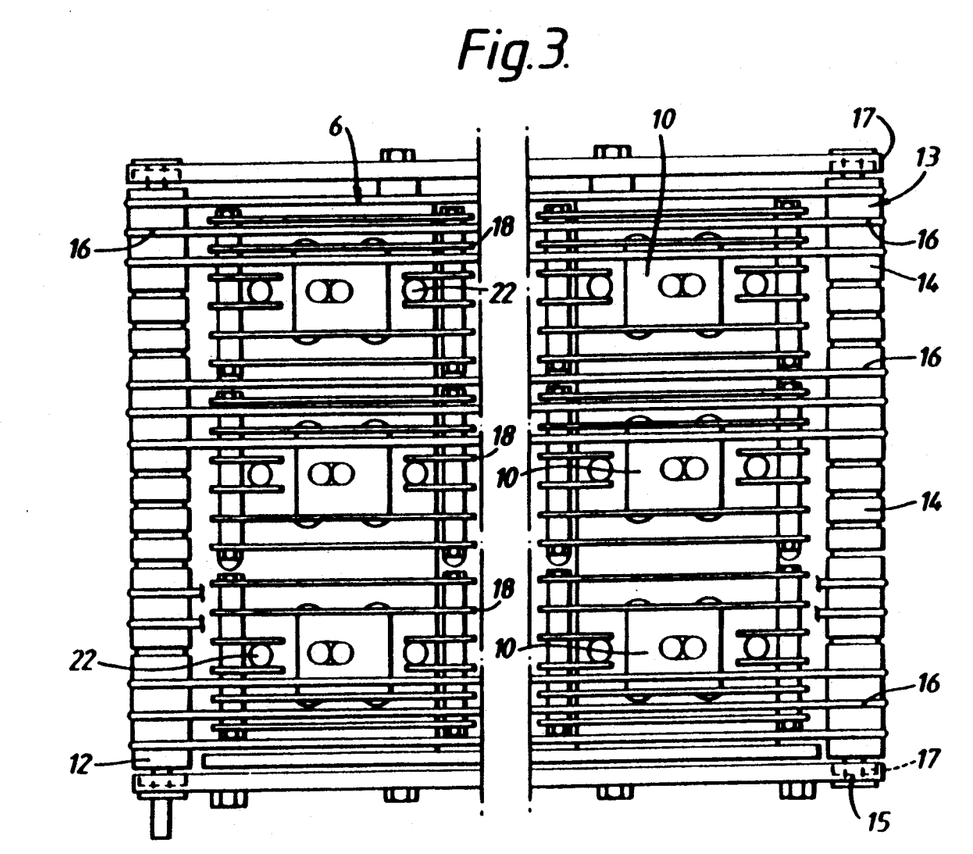
FIG. 3 is a plan of the output conveyor.
Figure 4:
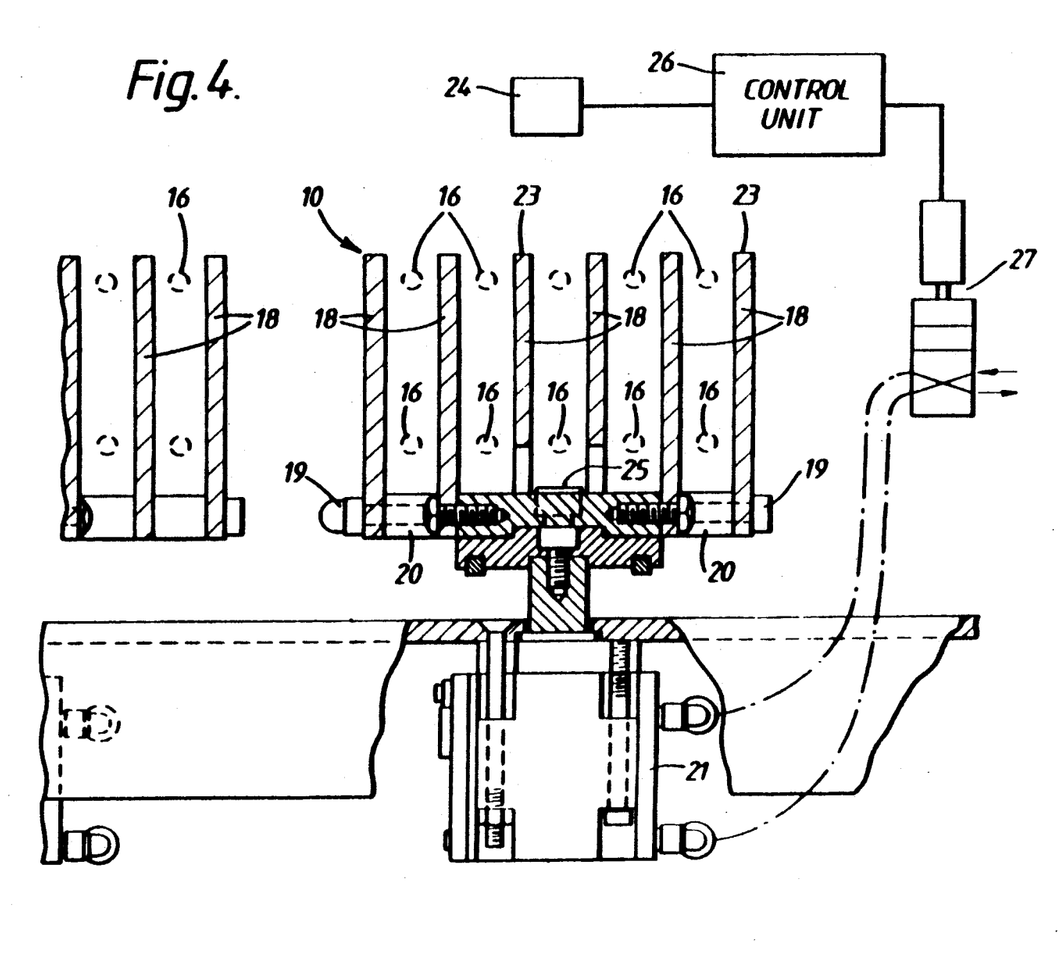
FIG. 4 is a cross-section through the output conveyor.

The output conveyor 6 comprises a driven roller 12 and an idler roller assembly 13. The idler roller assembly 13 is formed by a number of individual roller elements 14, each of which is freely rotatable on an axle 15 which itself is journalled and free to rotate in bearings 17. The driven roller 12 and idler roller assembly 13 are connected together by bands 16. The support platforms 10 are shown in more detail in FIG. 4 and comprise a number of upright elongate plates 18 intercalated between adjacent bands 16, of the output conveyor 6. The plates are connected together by nuts and bolts 19 with spacers 20 located between adjacent plates 18. The plate assemblies are mounted onto the ram of a pneumatic piston and cylinder assembly 21 and are also connected to guide pins 22 which are guided in corresponding bores (not shown) to constrain the movement of the platforms 10. Actuation of the pneumatic piston and cylinder assembly 21 brings upper surfaces 23 of the plates 18 to a level above the upper surface of the bands 16 as shown in FIG. 4, while lowering of the pneumatic piston and cylinder assembly 21 moves the upper surfaces 23 of the plates 18 to a level beneath that of the upper surface of the bands 16. In use, by lifting support platforms 10 a product being conveyed by the bands 16 is lifted above their surface and so is held stationary whilst the bands 16 continue to move forward.

The output conveyor 6 also includes photoemitter/-photodetector device 24 over each lane and just ahead of each lane of lift platforms 10 each with an associated retro-reflector 25. A computer based control unit indicated generally by reference numeral 26 controls the raising and lower of the support platforms 10 by actuation of solenoid controlled valves 27, independent of the presence of products in the region immediately above the support platforms 10. The driven roller 12 may rotate at a constant speed so that the linear speed of the conveyor 6 is matched to that of the input conveyor 4 and transfer conveyor 5 or, alternatively, the driven roller 12 may be controlled by the control unit 26 to accelerate and decelerate so that products are substantially stationary as they engage and dis-engage the top surface 23 of the support platforms 10. The deceleration of conveyor 6 and the subsequent acceleration back to line speed is arranged to occur before the next lane discharge from transfer conveyor 5 reaches the output conveyor 6 to avoid product disarrangement. The average speed of the output conveyor 6 is substantially the same as that of the other conveyors.

A steady stream of equally spaced shingled groups of product are fed by the slicing machine 1 and jump conveyor 2 onto the centraliser and reject conveyor 3. The input conveyor 4 comprises a multi-element strip conveyor with three moveable platforms 10, as described above, intercalated between the elements of the multi-element strip conveyor. This forms a product grouping device upstream of the transfer conveyor.

The transfer conveyor 5 is again a multi-element belt or strip conveyor which is mounted on guide rails 28 and arranged to be moved along the guide rails 28 transversely to the direction of conveyance of products along it. Where the transfer conveyor 5 moves only between two extreme positions it is preferably moved by a simple crank system which rotates 180° to move the conveyor 5 from one extreme position to the other. In this case the conveyor 5 is subjected to a simple harmonic motion which provides gentle acceleration and deceleration. Where the transfer conveyor 5 moves between more than two discrete positions the conveyor 5 is typically driven along the guide rails 28 by a lead screw driven by a stepper motor under the control of the control unit 26 to enable particular output patterns and sequences to be obtained in response to an operator controlled selection switch.

In use the packaging line is arranged so that a shingled group of slices to form the first of a group of slices leaves the conveyor 3 and moves along the conveyor 4. When this group reaches the downstream platform 10 the platform is lifted to lift the group off the conveyor 4 and hold it in position. As the next ,group of slices leaving the conveyor 3 moves along the conveyor 4 the centre platform 10 is raised as this group passes over it. Correspondingly the third platform 10 captures the third shingled group of slices. When all platforms 10 are loaded they are all lowered simultaneously to provide a closely spaced group of products which is then transferred from the conveyor 4 onto the transfer conveyor 5. With the transfer conveyor in its rightmost position as shown in FIG. 2 the group of products are aligned in the left hand lane of the transfer conveyor 5. As soon as the group of products is completely located on the transfer conveyor 5 the transfer conveyor is moved along the guide rails 28 to its leftmost position. Meanwhile the platforms 10 are marshalling the next group of slices. By the time that the first product of the first group is reaching the downstream end of the transfer conveyor 5, the transfer conveyor 5 has moved to its leftmost position and then the first group of products is discharged onto the left hand lane of the output conveyor 6. Simultaneously the next group of products are transferred from the input conveyor 4 to the right hand lane of the transfer conveyor 5. As the first group of products moves along the left hand lane of the output conveyor 6 the support platforms 10 are raised to stop the movement of the first group of products. The transfer conveyor 5 is not moved whilst the second group of products are transferred from its upstream to its downstream end thence onto the middle lane of the output conveyor 6. Again the platforms 10 have been marshalling the third group of products and these are transferred onto the right hand lane of the transfer conveyor 5 whilst the second group are being transferred from the right hand lane of the transfer conveyor 5 to the output conveyor 6. As soon as the third group of products has been loaded onto the transfer conveyor 5 it is moved towards its rightmost position, again as shown in FIG. 2. The third group of products is then transferred into the right hand lane of the output conveyor 6 whilst the fourth group of products is transferred into the left hand lane of the transfer conveyor 5 in a similar fashion to the first group. As soon as all nine platforms 10 on the output conveyor 6 have been loaded all drop simultaneously to transfer a 3×3 matrix of products along the further conveyors 7 and 8 and to the vacuum packaging machine 9.

Figure 5:
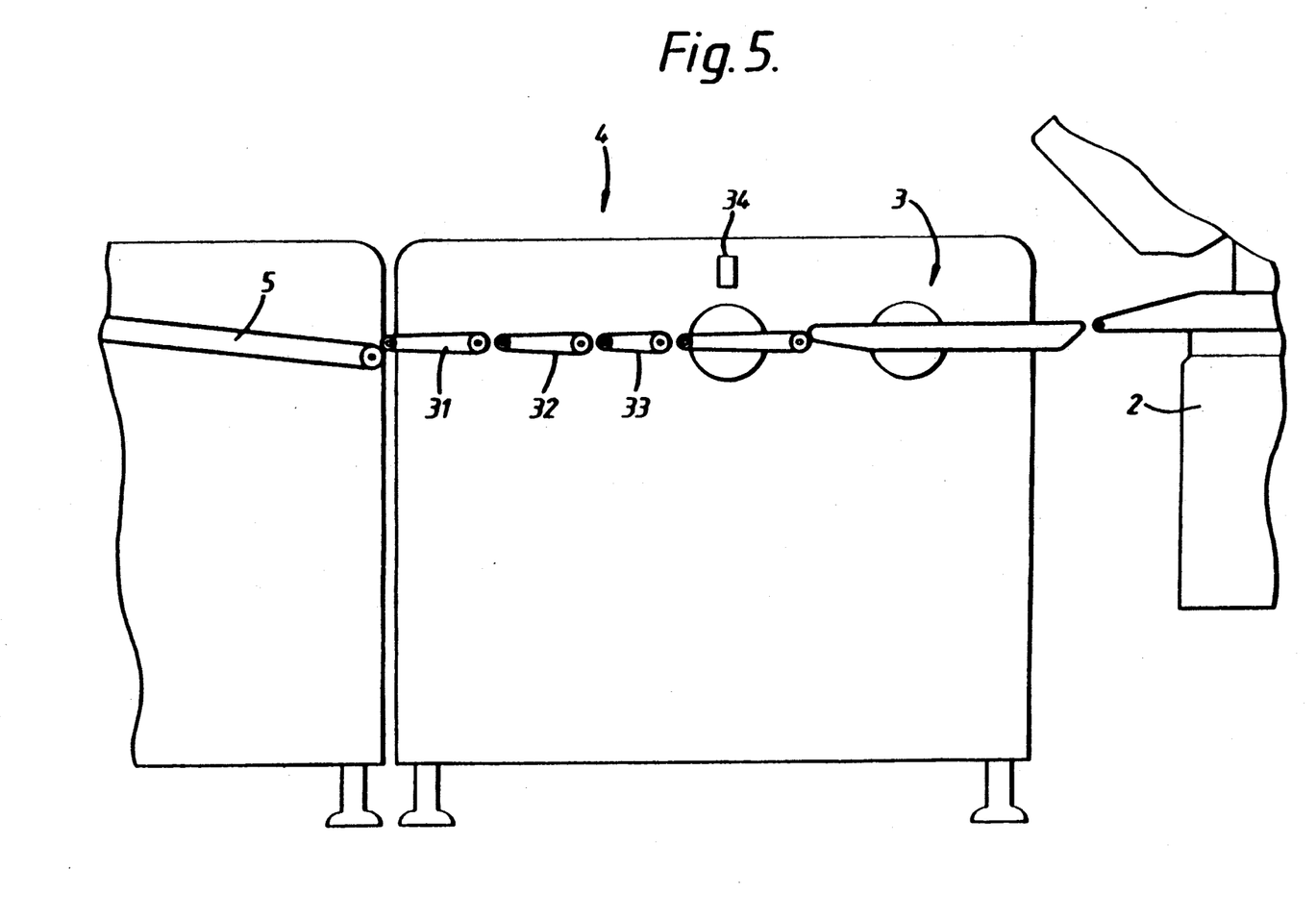
FIG. 5 is a side-elevation of an alternative form of input conveyor and output conveyor.

As an alternative to the platform 10 the input conveyor 4 may be formed by three short separate conveyors 31, 32 and 33 as shown in FIG. 5. A photodetector/photoemitter 34 which is generally similar to device 24 in FIG. 4 is mounted upstream from the three short conveyors to monitor the passage of stacks or shingles of slices. The short conveyors are driven by stepper motors or include encoders so that once the position of a group of slices is detected by detector 34 at a known position, the control unit 26 can determine when it should be on the conveyor 31, for example. To group together three stacks or shingles of slices the first short conveyor 31 is stopped when the first stack or shingle is located on it. The second short conveyor 32 is then stopped when the second stack or shingle is located on it and so on. All three short conveyors are then started at the same moment to feed the now assembled group of products towards the transfer conveyor 5. Preferably the speed of each infeed conveyor is ramped down in turn and re-accelerated jointly to prevent slippage. Alternatively of course each short conveyor may include its own photodetector/photoemitter in an analogous fashion to those on the output conveyor. Further, as shown in FIG. 5, the entire output conveyor can be formed by an array of short conveyors each of which is controlled by the control unit to provide the required 3×3 matrix.

Figure 6A:
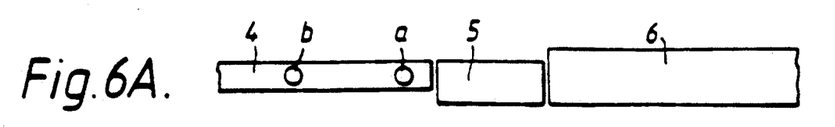
FIGS. 6A to 6F are a series of diagrams illustrating the operation of a simplest form of transfer conveyor system.
Figure 6B:
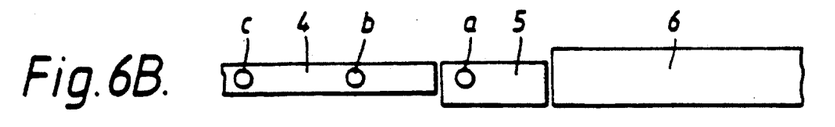
Figure 6C:
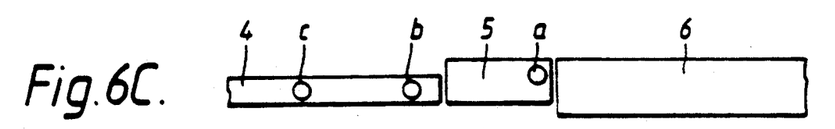
Figure 6D:
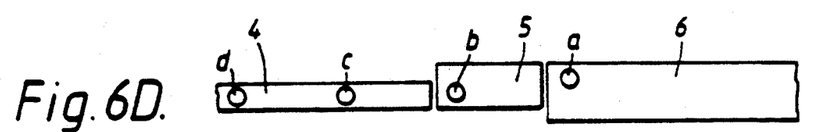
Figure 6E:
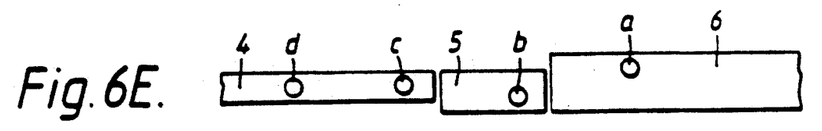
Figure 6F:
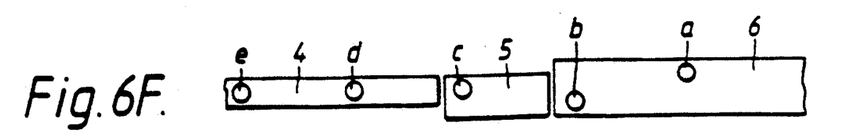

The operation of the transfer conveyor will now be described in more detail. Initially consider just the case where a spaced single stream of products are fed from an input conveyor 4 via a transversely moveable conveyor 5 to an output conveyor 6. In FIGS. 6, 7 and 8 the direction of movement of the products is from left to right and so is generally opposite to the direction of travel shown in FIGS. 1 to 5. A continuous stream of products a, b, c, d, e,... move along the input conveyor 4. With the transfer conveyor 5 in its rightmost position product a is transferred from the conveyor 4 to the transfer conveyor 5 as shown in FIG. 6. Whilst the transfer conveyor 5 moves the product a from its upstream to its downstream end the transfer conveyor 5 is moved transversely into its leftmost position as shown in FIG. 6C. Product a is then transferred from the transfer conveyor 5 to the left hand lane of the output conveyor 6 and, simultaneously, product b is transferred from the input conveyor 4 to the right lane of the transfer conveyor 5. This is shown in FIG. 6D. The transfer conveyor 5 is then moved transversely to the rightmost position as product b moves from its upstream to its downstream end. This is the position shown in FIG. 6E. Finally product b is transferred to the right hand lane of the output conveyor 6 whilst, simultaneously, product c is transferred from the input conveyor 4 to the left hand lane of transfer conveyor 5. This is the position shown in FIG. 6F. FIG. 6F is generally similar to the arrangement shown in FIG. 6B and the movements illustrated in FIG. 6B to 6E are repeated henceforth for successive products. The arrangement described with reference to FIG. 6 illustrates the simplest form of the present invention in which a single lane of spaced products is divided into two separate streams of spaced products. There is no product grouping on the conveyor 4 but the platforms 10 may be actuated to control timing to ensure that the stacks or shingles of slices are only transferred onto the transfer conveyor 5 when it is stationary.

Figure 7A:
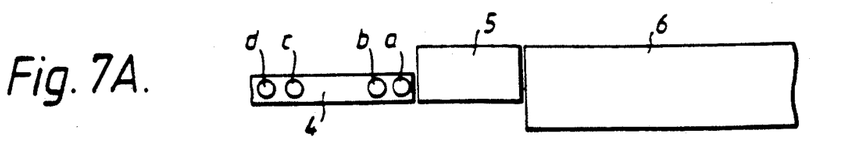
FIGS. 7A to 7H are a series of illustrations illustrating the one operation of the transfer conveyor system as shown in FIGS. 1 and 2.
Figure 7B:
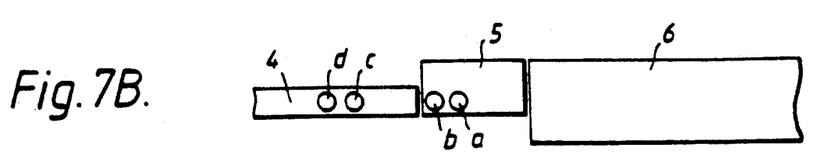
Figure 7C:
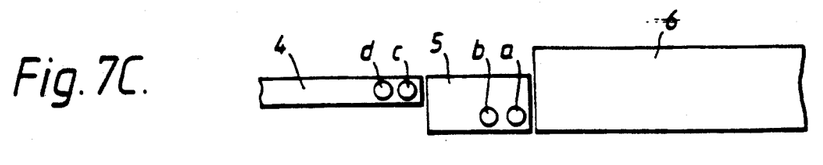
Figure 7D:
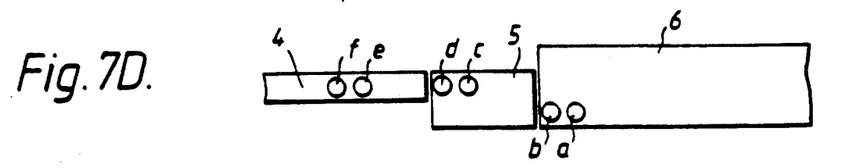
Figure 7E:
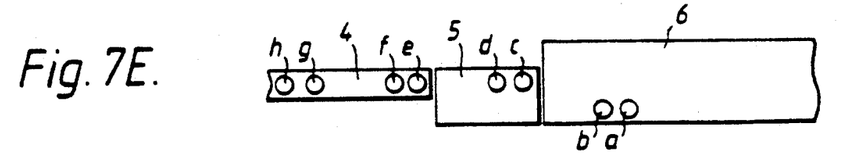
Figure 7F:
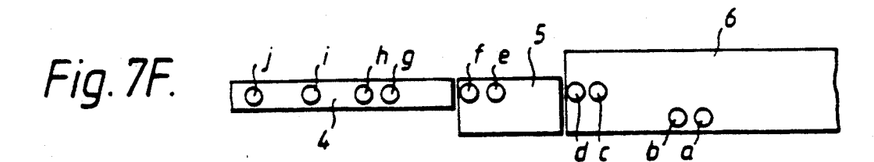
Figure 7G:
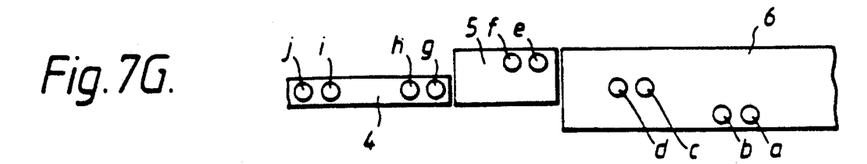
Figure 7H:
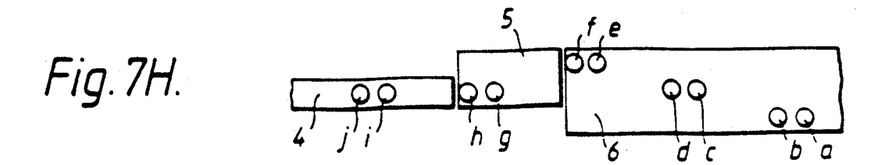

The arrangement illustrated diagramatically in FIG. 7 corresponds more closely to the arrangement shown in FIGS. 1 and 2 in that products from a single stream are split between three output streams but, to simplify the description groups each consisting of only two products will be described. Also the action of the platforms 10 on the output conveyor 6 are ignored. A first group containing products a and b is spaced in the direction of conveyance from a second group containing products c and d as they move along conveyor 4. Initially, as shown in FIG. 7B the transfer conveyor 5 is in its leftmost position so the first group of products ab are transferred into the right hand lane of transfer conveyor 5 as shown in FIG. 7B. The transfer conveyor 5 then moves into its rightmost position as the first group moves from the upstream end of the transfer conveyor 5 to the downstream end of transfer conveyor 5. This is the arrangement shown in FIG. 7C. Then, simultaneously, the first group of products ab are transferred from the transfer conveyor 5 to the right hand lane of output conveyor 6 whilst the second group of products cd are transferred from the conveyor 4 to the left hand lane of transfer conveyor 5. This is the position shown in FIG. 7D. The transfer conveyor 5 remains in its rightmost position whilst the second group of products cd are transferred from the left hand lane of transfer conveyor 5 to the middle land of output conveyor 6 and, simultaneously, a third group of products ef are transferred to the input end of the transfer conveyor 5. This is the position in FIG. 7F. Then, whilst the third group of products ef move from the upstream to the downstream end of transfer conveyor 5 the transfer conveyor 5 is moved to its leftmost position as shown in FIG. 7C. The third group of products ef are then transferred from the left hand lane of the transfer conveyor 5 to the left hand lane of the output conveyor 6 whilst, simultaneously, a third group of products gh are transferred to the upstream end of the right hand lane of the transfer conveyor 5. This is the position shown in FIG. 7H. FIG. 7H corresponds to FIG. 7B and accordingly the operations described with reference to FIG. 7B to 7G are repeated with succeeding groups of products.

Some vacuum packaging machines 9 package a 4×4 matrix of products and the diagrams illustrated in FIG. 8 show the arrangements and movements of a transfer conveyor under these circumstances. Of course an additional lane of platforms 10 would have to be provided on the output conveyor 6 and four platforms 10 provided in each lane. A single stream of groups of four products t, u, v, w, x . . . is fed from an input conveyor 4, to a transfer conveyor 5, an output conveyor 6 downstream of the transfer conveyor 5 and a final output conveyor 7 is downstream of the conveyor 6.

Figure 8A:
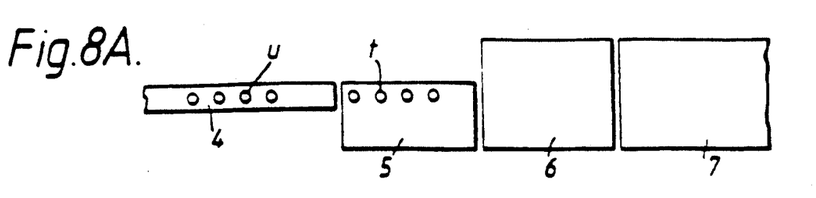
FIGS. 8A to 8F are a series of diagrams illustrating another operation of the transfer conveyor system; and,
FIG. 9 is a plan of another example of transfer conveyor system.
Figure 8B:
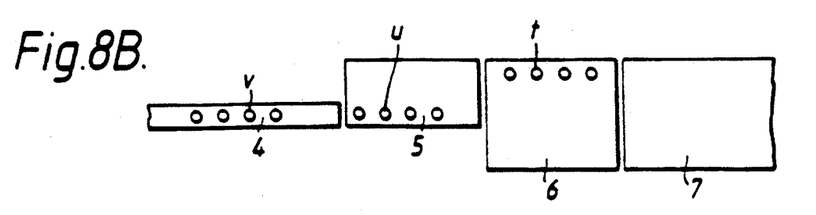
Figure 8C:
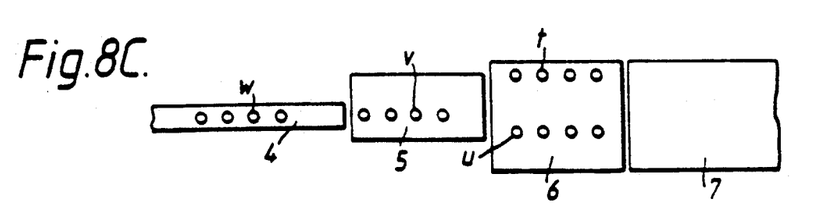
Figure 8D:
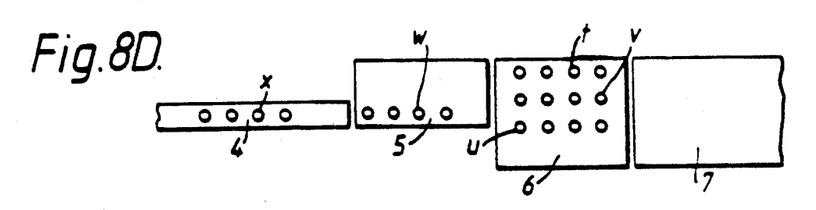
Figure 8E:
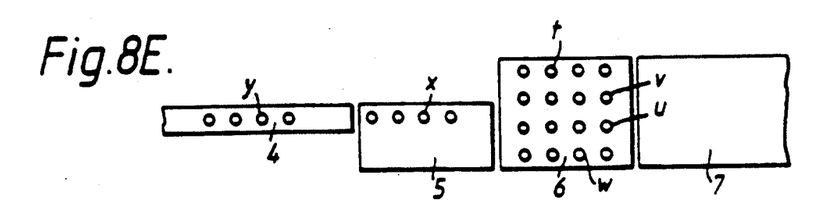

Initially, the transfer conveyor 5 is in its rightmost position as shown in FIG. 8A and a first group of products is fed from the input conveyor 4 to the left hand side of the transfer conveyor 5. The transfer conveyor 5 is then moved to its leftmost position by one and a half lane widths as shown in FIG. 8B and the first group t of products is transferred onto the leftmost or first lane of the conveyor 6 whilst the next group of products u is transferred onto the right hand side of the transfer conveyor 5. The transfer conveyor 5 is then moved towards the right by half a lane width to the position shown in FIG. 8C and the group u of products is transferred onto the third lane of the conveyor 6 whilst the next group v of products is transferred from the input conveyor 4 onto transfer conveyor 5. The transfer conveyor is then moved towards the left by half a lane width and returns to its leftmost position as shown in FIG. 8D and the group v of products is transferred to the second lane of the conveyor 6 whilst the following group of products w is transferred from the input conveyor 4 to the transfer conveyor 5 as shown in FIG. 8D. The transfer conveyor 5 moves one end and a half lane widths to its rightmost position as shown in FIG. 8E and discharges the group w onto the fourth and right hand lane of the conveyor 6 and the following group x of products is transferred from the input conveyor 4 to the left hand side of the transfer conveyor 5.

Figure 8F:
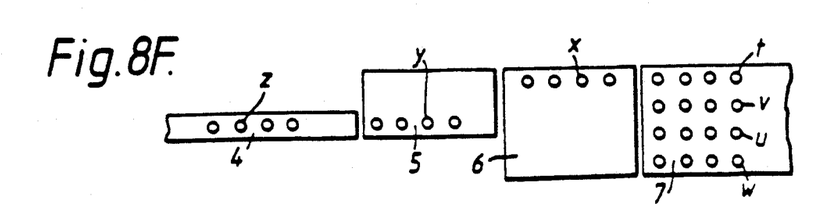

The platforms 10 then lower to allow all four lanes of products on the conveyor 6 to move forwards onto the conveyor 7 and towards the vacuum packaging machine 9. Meanwhile, the transfer conveyor 5 moves to its leftmost position so that as the groups t, u, v and w move onto the conveyor 7 the group x is transferred from the left hand side of the transfer conveyor 5 to the left hand or first lane of the conveyor 6 as shown in FIG. 8F. FIG. 8E corresponds to FIG. 8A and accordingly the operations as described with reference to FIGS. 8A to 8D are repeated to form the next 4×4 array of products on the conveyor 6.

Figure 9:
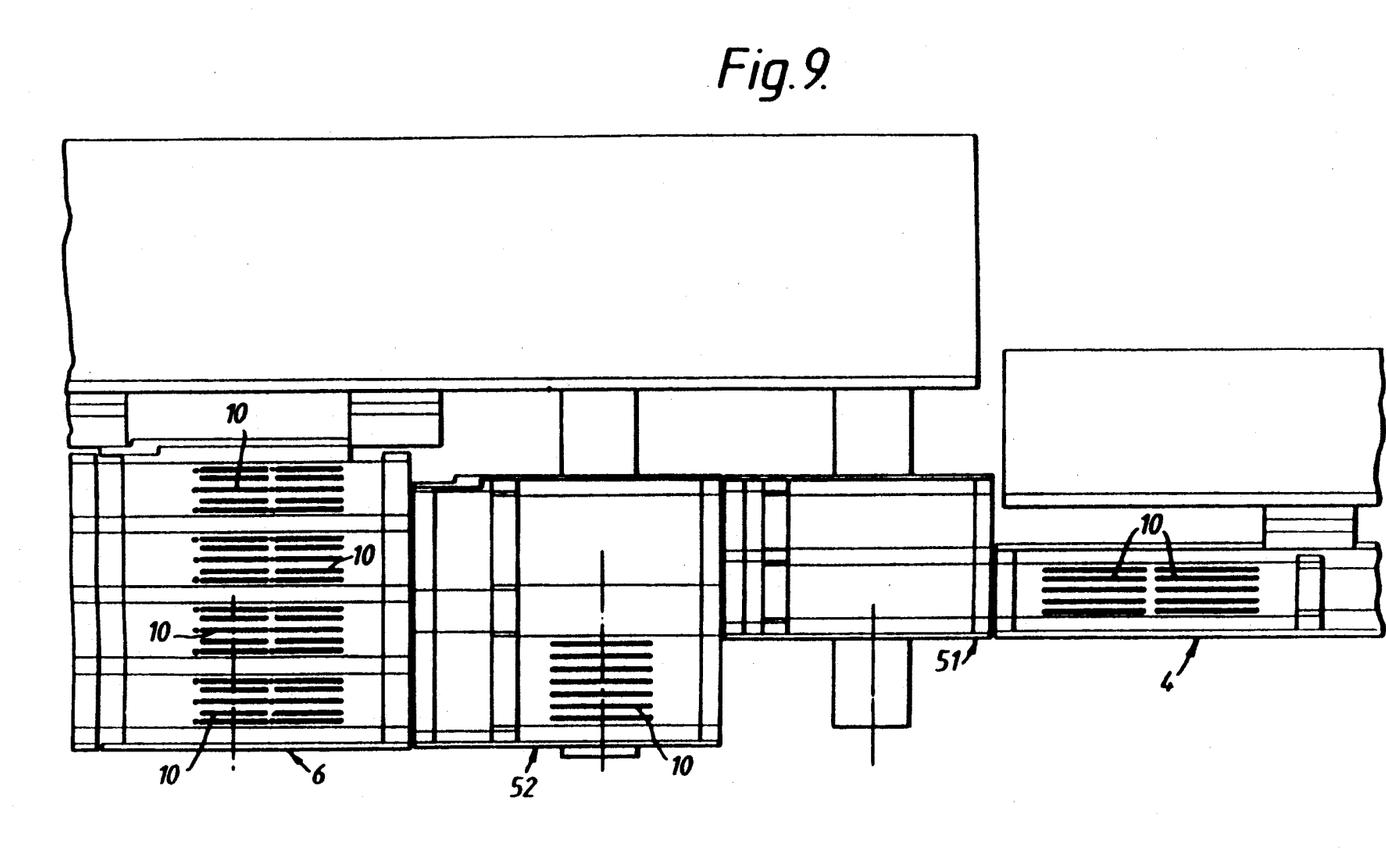

Another example of transfer conveyor system is shown in FIG. 9 and includes two transfer conveyors 51 and 52 one downstream of the other. The first transfer conveyor 51 moves transversely twice as far as the second transfer conveyor 52. In effect the first transfer conveyor 51 doubles the input streams of product from the input conveyor 4 to two lanes and then the second transfer conveyor 52 doubles this again to produce four output lanes on the output conveyor 6. By sharing the lane multiplication between two transfer conveyors 51 and 52 neither need move as far as the single transfer conveyor 5 described with reference to FIG. 8 and this enables the transfer operation to be speeded up. The second transfer conveyor 52 also includes a stop platform 10 and this enables products to be stopped on it to add further flexibility to its operating regime.

Preferably in all examples the speed of the individual conveyors is controlled so that following conveyors move at the same speed during a transfer operation. It is also preferred that the conveyors are substantially stationary during lifting and lowering of the platforms and accelerate smoothly to ensure that there is no displacement between adjacent slices of products during their starting and stopping.

I claim:

1. A conveyor system for multiplying one or more input streams of product into two or more output streams of product comprising:
    an input conveyor (4) for conveying the one or more input streams of product,
    a transfer conveyor (5, 51, 52) which is movable bodily in a direction transverse to its conveying direction and which is arranged to receive products from the input conveyor (4),
    a multi-lane output conveyor (6) which carriers multiple sideby-side streams of product, the multi-lane output conveyor (6) being arranged to receive products from the transfer conveyor (5, 51, 52),
    means (10) to control the forward movement of the products in the one or more input streams of product, and
    means (10) to control the forward movement of the products in each stream on the output conveyor (6) to enable the products to be aligned with one another across the output conveyor, in which a single spaces stream of products is conveyed by the input conveyor (4) and in which the means (10) to control the forward movement of the products ensures that the products are entirely on the transfer conveyor (5, 51, 52) when the transfer conveyor (5, 51, 52) moves transversely, so that the products do not span a joint between the input conveyor (4) and the transfer conveyor (5, 51, 52) or between the transfer conveyor (5, 51, 52) and the output conveyor (6) during transverse movement of the transfer conveyor (5, 51, 52).

2. A conveyor system according to claim 1, in which the means (10) to control the forward movement of the products collects successive products into groups so that the products are transferred from the input conveyor (4) to the transfer conveyor (5, 51, 52) in groups.

3. A conveyor system according to claim 1, in which the input conveyor and means (10) to control the forward movement of products comprise a multi-element belt with one or more moveable stop platforms formed by upright elongate plates (18) intercalated between bands (16) of the conveyor.

4. A conveyor system according to claim 2, in which the input conveyor and means to control the forward movement of products comprise a number of individual short conveyors (31, 32, 33) located one behind the other and arranged with the drive of each conveyor being independently controlled so that upon the arrival of the first product of each group of products on a first short conveyor, a second, immediately succeeding short conveyor is stopped to permit transfer of the group of products to the second short conveyor; and upon arrival of the group at the second short conveyor, a third short conveyor, immediately succeeding the second, is stopped to permit transfer of the group of products to the third short conveyor; such that upon the arrival of the final product of the group said each group of products is spaced in the conveying direction from a succeeding group of products.

5. A conveyor system according to claim 2, in which the multi-lane output conveyor (6) comprises a multielement belt with a single drive providing the forward movement of all of the streams of products by the output conveyor, and in which the means to control the forward movement of the products comprises at least one moveable stop platform (10) formed by upright elongate plates (18) intercalated between bands (16) of the output conveyor (6) which can be lifted to lift products upwards out of contact with the bands (16) of the multiple element strip conveyor and so hold the groups of products at a particular location until a succeeding product in another stream reaches the same location whereupon the platforms (10) are lowered to that transverse rows of product are formed across the output conveyor (6).

6. A conveyor system according to claim 1, in which two transfer conveyors (51, 52) are provided between the input conveyor (4) and the output conveyor (6), the first conveyor (51) receiving products from the input conveyor (4) and discharging the products onto the second transfer conveyor (52) and the second transfer conveyor (52) discharging the products onto the output conveyor (6).

7. A foodstuff packaging line comprising in order a slicing machine (1) for cutting slices off a block of foodstuff, a jump conveyor (2) to collect the slices together into a stack of shingle, a conveyor system, and a multilane vacuum packaging machine (9) to vacuum pack the stacks or shingles of foodstuff, said conveyor system comprising: an input conveyor (4) for conveying the one or more input steams of product, a transfer conveyor (5, 51, 52) which is movable bodily in a direction transverse to its conveying direction and which is arranged to receive products from the input conveyor (4), and a multi-lane output conveyor (6) which carries multiple side-by-side streams of product and is arranged to receive products from the transfer conveyor (5, 51, 52), characterized in that the conveyor system also includes means (10) to control the forward movement of the products in the one or more input streams of product, in which a single spaced stream of products is conveyed by the input conveyor (4) and in which the means (10) to control the forward movement of the products ensures that the products are entirely on the transfer conveyor (5, 51, 52) when the transfer conveyor (5, 51, 52) moves transversely, so that the products do not span a joint between the input conveyor (4) and the transfer conveyor (5, 51, 52) or between the transfer conveyor (5, 51, 52) and the output conveyor (6) during transverse movement of the transfer conveyor (5, 51, 52), and means (10) to control the forward movement of the products in each stream on the output conveyor (6) to enable the products to be aligned with one another across the output conveyor.

8. A conveyor system for multiplying one or more input streams of product into two or more output streams of product comprising:
   an input conveyor (4) for conveying the one or more input streams of product,
   a transfer conveyor (5, 51, 52) which is movable bodily in a direction transverse to its conveying direction and which is arranged to receive products from the input conveyor (4),
   a multi-lane output conveyor (6) which carries multiple side-by-side streams of product, the multi-lane output conveyor (6) being arranged to receive products from the transfer conveyor (5, 51, 52),
   means (10) to control the forward movement of the products in the one or more input streams of product, and
   means (10) to control the forward movement of the products in each stream on the output conveyor (6) to enable the products to be aligned with one another across the output conveyor,
   wherein, a single spaced stream of products is conveyed by the input conveyor (4),
   the means (10) to control the forward movement of the products ensures that the products are entirely on the transfer conveyor (5, 51, 52) when the transfer conveyor (5, 51, 52) moves transversely, so that the products do not span a joint between the input conveyor (4) and the transfer conveyor (5, 51, 52) or between the transfer conveyor (5, 51, 52) and the output conveyor (6) during transverse movement of the transfer conveyor (5, 51, 52), and
   the means (10) to control the forward movement of the products collects successive products into the groups so that the products are transferred from the input conveyor (4) to the transfer conveyor (5, 51, 52) in groups.

* * * * *